J. C. KING.
MEANS FOR MEASURING TEETH.
APPLICATION FILED FEB. 1, 1919.
1,323,697.
Patented Dec. 2, 1919.
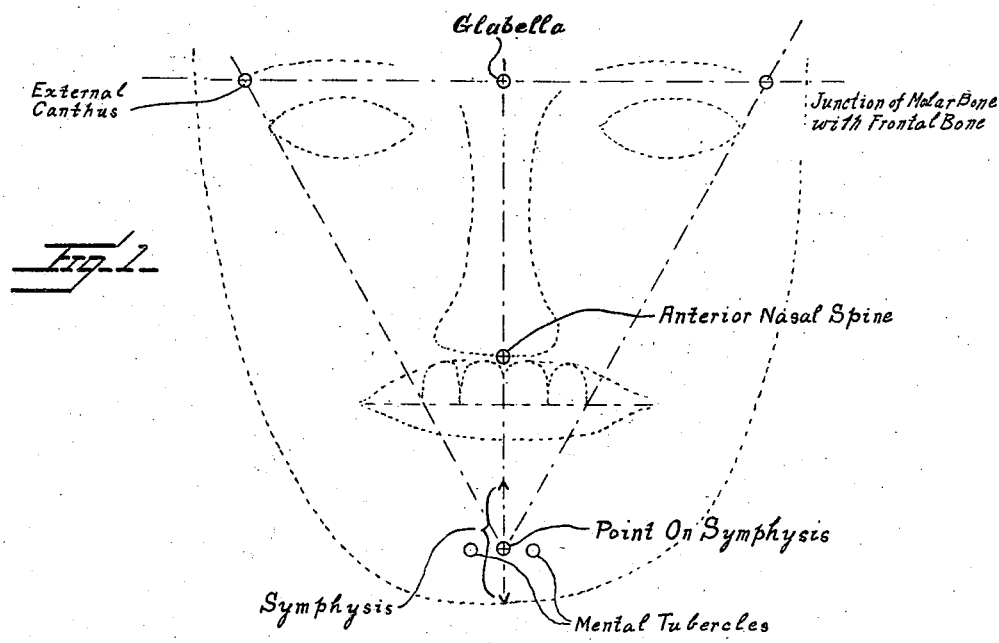
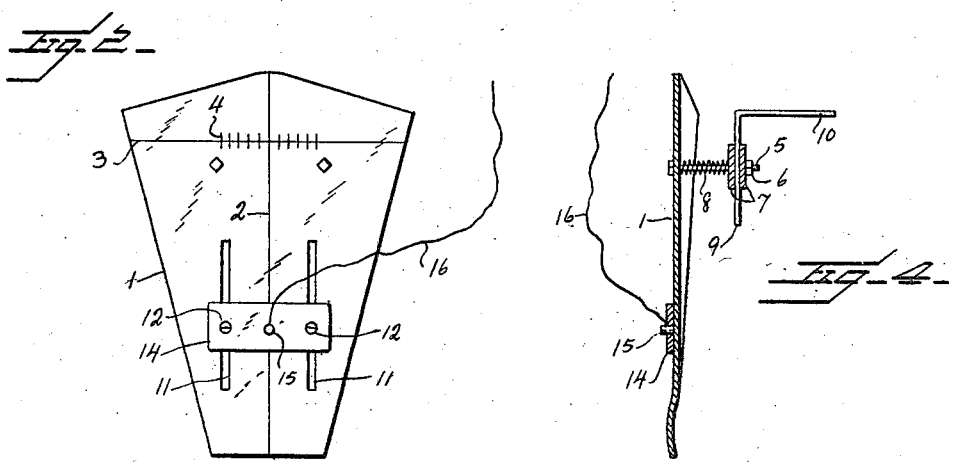
Inventor
J. C. King
By Watson E. Coleman
Attorney

UNITED STATES PATENT OFFICE.

JESSE C. KING, OF LA JUNTA, COLORADO.

MEANS FOR MEASURING TEETH.

1,323,697. Specification of Letters Patent. Patented Dec. 2, 1919.

Application filed February 1, 1919. Serial No. 274,552.

*To all whom it may concern:*

Be it known that I, JESSE C. KING, a citizen of the United States, residing at La Junta, in the county of Otero and State of Colorado, have invented certain new and useful Improvements in Means for Measuring Teeth, of which the following is a specification, reference being had to the accompanying drawings.

This invention relates to a means for determining the widths of teeth required for an individual patient for proper restoration by artificial dentures, and it is an object of the invention to provide a novel and improved means whereby such widths may be determined by facial characteristics of the individual patient and particularly when the teeth or a considerable number of teeth of a patient have previously been extracted.

Furthermore, it is an object of the invention to provide a novel and improved method and means for this general purpose wherein the desired calculations are computed in connection with a line extending from the glabella through the anterior nasal spine to a point on symphysis between the mental tubercles, and in connection with a second line extending from said point on symphysis to the external or posterior canthus of an eye, and in conjunction with an instrument provided with measurement graduations extending along the lip line.

The novel features of my invention will hereinafter be definitely claimed.

In order that my invention may be the better understood, I will now proceed to describe the same with reference to the accompanying drawings, wherein:

Figure 1 is a diagrammatic view illustrating the method for measuring teeth in accordance with my present invention;

Fig. 2 is a view in front elevation of the measuring instrument or gage as herein embodied, the parts thereof which would show through the body or sheet being omitted for clarity of disclosure;

Fig. 3 is a view in top plan of the measuring instrument or gage as illustrated in Fig. 2; and Fig. 4 is a longitudinal sectional view taken through the measuring instrument or gage with certain of the parts in elevation.

As disclosed in the accompanying drawings, 1 denotes an elongated body comprising a sheet of transparent material and of a form to closely contact with the mental tubercles or chin of a patient, and of a length to overlie the symphysis and to extended above the lip line or mouth. Disposed longitudinally of the body or sheet 1 at substantially its transverse center is a line 2 suitably produced thereon, and the upper end portion of said body or sheet is also provided with a transversely disposed line 3 at right angles to the line 2. The line 3 is also produced upon the body or sheet 1 in any desired manner. The line 3 has coacting therewith the measuring graduations 4 extending on opposite sides of the line 2, and which measuring graduations afford means whereby the widths of the teeth, and more particularly the permanent incisors at their incisal edge may be determined.

Extending rearwardly from the body or sheet 1 below the line 3 and at opposite sides of the line 2 are the posts 5 provided with the enlargements or stops 6. A pair of plates 7 connecting the posts 5 are slidably engaged therewith, and said plates 7 are constantly urged toward the stops or enlargements 6 through the medium of the expansible members 8 interposed between the body or sheet 1 and the inner plate 7. As herein disclosed each of the expansible members 8 comprises a coil spring encircling a post 5.

9 denotes a flat shank slidably disposed between the plates 7 so that said shank 9 and the body or sheet 1 may be readily adjusted one relative to the other in a direction longitudinally of the shank 9 and longitudinally of the body or sheet 1. The shank 9 is also of a width less than the distance between the posts 5 so that a relative lateral or transverse adjustment of the shank 9 and the body or sheet 1 may be obtained.

The upper end portion of the shank 9 is provided with an extension 10 disposed perpendicular to the shank 9 and in a direction away from the inner face of the body or sheet 1 and which extension 10 serves as a penetrating member and is adapted to be inserted within a wax model of the teeth when taking the "bite".

The lower portion of the body or sheet 1 at opposite sides of the line 2 is provided with the longitudinally disposed slots 11 arranged in parallelism, and through which are directed the headed retainers 12 arranged at the opposite end portions of the slide 14. The slide 14 preferably comprises a substantially rectangular sheet of transparent material with its longitudinal axis disposed transversely of the body or sheet 1. At substantially its center and at a point coincident with the line 2, the slide 14 has secured thereto through the medium of a lug 15 or the like, an end portion of an elongated flexible member 16, preferably string, and which member is of a length to extend from a point on symphysis between the mental tubercles of a patient to the glabella or to the outer external or posterior canthus of an eye.

In operation, the extension or penetrating member 10 is placed in the wax model of the teeth when taking the bite or when the model is held in the mouth of a person being operated on, and the body or sheet 1 is adjusted until the line 2 is positioned on the vertical median line of the face or the line from glabella and extending through the anterior nasal spine to a point on symphysis between the mental tubercles, and said body or member 1 is also adjusted to position the line 3 coincident with the lip line or, in other words, at the line approximating the line of teeth for the mouth at the incisal edges of the teeth. The slide 14 is then adjusted to bring the central portion thereof or the portion to which the member 16 is attached to the point on symphysis between the mental tubercles which may be found by a slight depression between the mental tubercles. The flexible member 16 is then directed in a taut condition to the external or posterior canthus of an eye, and the space between the point on the line 3 crossed by the member 16 and the line 2 taken along the line 3 will indicate the width of two teeth, namely, a central incisor and the adjacent lateral incisor. In other words, the point on the line 3 where the member 16 crosses is the outer corner of a lateral tooth at its end known as the lowest point on the tooth. In view of this, it will be at once self evident that the width of these teeth will be caused to correspond with the presumed natural characteristics of the face and which is materially determined by the width of the forehead of the patient, as the distance between the external or posterior canthuses of the eyes will be in accordance with the width of the forehead. It is to be understood that the various adjustments of the plate 1 and the members carried thereby are effected while the device is held against the face of the patient.

All points of expression of faces swing from the mental point taken for the basis of measurement, namely, the chin on the center line between the tubercles and all main points are within the angle or triangle formed by a line drawn from the chin through the inner edge of the external or posterior canthus and a line drawn across the forehead through the glabella to the other side of the face and again back to the chin point. In other words, the face is an equilateral triangle, with the base on the forehead, and this triangle includes the glabella, chin center line between the tubercles, the anterior nasal spine and the external or posterior canthus of each eye, or in other words, five points. The center or median line includes the glabella, anterior nasal spine and the mental point with the glabella common to the line on the forehead drawn from the junctions of malar bone and frontal bone at each side of the face above exterior canthuses of eyes.

In practice, the canthus is taken as a flesh point, as the bony point cannot be found with any degree of certainty, but is known as the junction of the malar bone with the frontal bone, but since the canthus corresponds to the same and is on a line that runs from the junction of the malar bone and frontal bone to the chin, it answers the case.

I claim:

1. A gage for measuring teeth including a transparent body, means for supporting said body in a position to overlie the junction of the lip line of a face and a median line on the face extending from the glabella through the anterior nasal spine to a point on the symphysis of the mental tubercles, and a flexible member carried by the body and adapted to be disposed substantially in a straight line from the point on the symphysis between the mental tubercles to the posterior canthus of an eye.

2. A gage for measuring teeth including a body, means for supporting said body in a position to overlie the junction of the lip line of a face and a median line on the face extending from the glabella through the anterior nasal spine to a point on symphysis between the mental tubercles, and a flexible member carried by the body and adapted to be disposed substantially in a straight line from the point on symphysis between the mental tubercles to the posterior canthus of an eye, said body being provided with means to identify the lip line and the median face line.

3. A gage for measuring teeth including a body, means for supporting said body in a position to overlie the junction of the lip line of a face and a median line on the face extending from the glabella through the anterior nasal spine to a point on symphysis between the mental tubercles, and a flexible member carried by the body and adapted to be disposed substantially in a straight line from the point on the symphysis between the mental tubercles to the posterior canthus of an eye, said body being provided with means to identify the lip line and the median face line, the means defining the lip line having coacting therewith measuring graduations.

4. A gage for measuring teeth comprising a body, means carried by the body for engagement with the plastic material of a dental model, while the model is held in the mouth of a person, a slide carried by the body, and a flexible member engaged at one end to the slide.

5. A gage for measuring teeth comprising a body, means carried by the body for engagement with the plastic material of a dental model, while the model is held in the mouth of a person, a slide carried by the body, and a flexible member engaged at one end to the slide, said body being provided with a line to be arranged coincident with the median line of a face extending from the glabella through the anterior nasal spine to a point on symphysis between the mental tubercles when the gage is in applied position.

6. A gage for measuring teeth comprising a body, means carried by the body for engagement with the plastic material of a dental model, while the model is held in the mouth of a person, a slide carried by the body, and a flexible member engaged at one end to the slide, said body being provided with a line to be arranged coincident to the lip line of a face when the gage is in applied position.

7. A gage for measuring teeth comprising a body, means carried by the body for engagement with the plastic material of a dental model, while the model is held in the mouth of a person, a slide carried by the body, and a flexible member engaged at one end to the slide, said body being provided with a line to be arranged coincident to the lip line of a face when the gage is in applied position, and measuring graduations coacting with said line.

8. A gage for measuring teeth comprising a body, a shank adjustably engaged with the body, said body and shank being adjustable one relative to the other longitudinally of the shank, means carried by the shank for engagement within the plastic material of a model, while the model is held in the mouth of a person, and an elongated member secured to the body for coaction with an outer canthus of an eye.

9. A gage for measuring teeth comprising a body, a shank adjustably engaged with the body, said body and shank being adjustable one relative to the other transversely of the shank, means carried by the shank for engagement within the plastic material of a model, while the model is held in the mouth of a person, and an elongated member secured to the body for coaction with an outer canthus of an eye.

10. A gage of the class described for measuring teeth comprising a body, posts extending beyond a face of said body, plates connecting said posts and loosely mounted thereon, means for constantly urging one of the plates toward the other, and a supporting member slidably disposed between the plates.

11. A gage of the class described for measuring teeth, comprising a body, a post extending upon a face of said body, plates connecting said posts, said plates being supported for movement one relative to the other in a direction longitudinally of the posts, means for constantly urging one of said plates toward the other, and a supporting member slidably disposed between the plates.

In testimony whereof I hereunto affix my signature in the presence of two witnesses.

JESSE C. KING.

Witnesses:
J. M. TETER,
L. E. WHISLER.